US012618761B2

(12) United States Patent
Wang et al.

(10) Patent No.: US 12,618,761 B2
(45) Date of Patent: May 5, 2026

(54) HIGH-THROUGHPUT QUANTITATIVE MEASUREMENT OF BULK MECHANICAL PROPERTIES OF SOFT MATERIALS

(71) Applicant: Northwestern University, Evanston, IL (US)

(72) Inventors: Muzhou Wang, Evanston, IL (US);
Justin E. Griffith, Naperville, IL (US);
Yusu Chen, Fremont, CA (US);
Kenneth R. Shull, Evanston, IL (US);
Danielle Tullman-Ercek, Wilmette, IL (US)

(73) Assignee: Northwestern University, Evanston, IL (US)

( * ) Notice: Subject to any disclaimer, the term of this patent is extended or adjusted under 35 U.S.C. 154(b) by 329 days.

(21) Appl. No.: 18/206,766

(22) Filed: Jun. 7, 2023

(65) Prior Publication Data

US 2023/0393045 A1 Dec. 7, 2023

Related U.S. Application Data

(60) Provisional application No. 63/349,643, filed on Jun. 7, 2022.

(51) Int. Cl.
*G01N 3/16* (2006.01)
*G01N 3/06* (2006.01)

(52) U.S. Cl.
CPC .............. *G01N 3/165* (2013.01); *G01N 3/068* (2013.01); *G01N 2203/0037* (2013.01); *G01N 2203/0067* (2013.01); *G01N 2203/0075* (2013.01)

(58) Field of Classification Search
None
See application file for complete search history.

(56) References Cited

U.S. PATENT DOCUMENTS

| | | | |
|---|---|---|---|
| 2016/0002718 A1* | 1/2016 | Buermann | B01L 3/502715 |
| | | | 435/6.12 |
| 2023/0305013 A1* | 9/2023 | Huang | G01N 1/28 |
| 2025/0085203 A1* | 3/2025 | Moon | B01L 3/502753 |

FOREIGN PATENT DOCUMENTS

CN 107290550 A * 10/2017 ............. G01N 33/80

OTHER PUBLICATIONS

Justin E. Griffith et al., "Quantitative high-throughput measurement of bulk mechanical properties using commonly available equipment," *Mater. Horiz.*, 2023, 10, 97; pp. 1-20.

(Continued)

*Primary Examiner* — Peter J Macchiarolo
*Assistant Examiner* — Jermaine L Jenkins
(74) *Attorney, Agent, or Firm* — Bell & Manning, LLC

(57) ABSTRACT

Provided herein are systems and methods for carrying out high-throughput quantitative measurements of bulk mechanical properties of soft materials. The systems include a centrifuge, solid particles, and sample wells. In the systems and methods, samples comprising solid particles embedded in soft materials contained within sample wells are centrifuged in a series of increasing centrifugal speed increments, and a bulk mechanical property, such as fracture stress or elastic modulus, of each soft material is determined by monitoring the centrifugal force needed for the solid particles to fracture the soft material in each of the samples.

13 Claims, 8 Drawing Sheets
(2 of 8 Drawing Sheet(s) Filed in Color)

(56)            References Cited

OTHER PUBLICATIONS

Yusu Chen et al., "High-Throughput Screening Test for Adhesion in Soft Materials Using Centrifugation," *ACS Cent. Sci.* Jun. 28, 2021, 7; pp. 1135-1143.

Ken Halvorsen et al., "Massively Parallel Single-Molecule Manipulation Using Centrifugal Force," *Biophysical Journal* Jun. 2010, vol. 98; pp. L53-L55.

Darren Yang et al., "Multiplexed single-molecule force spectroscopy using a centrifuge," *Nature Communications,* Mar. 2016, 7:11026; pp. 1-8. DOI: 10.1038/ncomms11026/ncomms11026.

Audra J. DeStefano et al., "Where Biology and Traditional Polymers Meet: The Potential of Associating Sequence-Defined Polymers for Materials Science," *JACS Au* Aug. 26, 2021, 1; pp. 1556-1571.

Xiaokun Zhang et al., "Combinatorial approaches for high-throughput characterization of mechanical properties," *J Materiomics* 3 (Sep. 1, 2017); pp. 209-220.

V. Breedveld et al., "Microrheology as a tool for high-throughput screening," *Journal of Materials Science* 38 (Nov. 2003); pp. 4461-4470.

Richard Chasen Spero et al., "High throughput system for magnetic manipulation of cells, polymers, and biomaterials," *Review of Scientific Instruments* (Aug. 29, 2008), 79, 083707-1 to 083707-7.

Jeremy Cribb et al., "A high throughput array microscope for the mechanical characterization of biomaterials," *Review of Scientific Instruments* (Feb. 1, 2015), 86, 023711.

Katherine Joyner et al., "Microrheology for biomaterial design," APL Bioeng (Dec. 1, 2020) 4; pp. 041508-1 to 041508-12.

Ding, Yan, et al., "High-Throughput Screening of Self-Healable Polysulfobetaine Hydrogels and their Applications in Flexible Electronics," *Advanced Functional Materials* 31.18 (May 2021): 2100489 (1 of 11).

Xu, Fei, et al., "High-throughput synthesis, analysis, and optimization of injectable hydrogels for protein delivery," *Biomacromolecules* 21.1 (Nov. 2019): 214-229.

\* cited by examiner

F

HIGH-THROUGHPUT QUANTITATIVE MEASUREMENT OF BULK MECHANICAL PROPERTIES OF SOFT MATERIALS

CROSS-REFERENCE TO RELATED APPLICATIONS

The present application claims priority to U.S. provisional patent application no. 63/349,643 that was filed Jun. 7, 2022, the entire disclosure of which is incorporated herein by reference.

REFERENCE TO GOVERNMENT RIGHTS

This invention was made with government support under grant number DMR1720139 awarded by the National Science Foundation. The government has certain rights in the invention.

The patent or application file contains at least one drawing executed in color. Copies of this patent or patent application publication with color drawing(s) will be provided by the Office upon request and payment of the necessary fee.

BACKGROUND

In the era of Big Data and Artificial Intelligence (AI), there is a pressing demand for large datasets of materials properties to train machine learning models that can aid in materials discovery. While advances in combinatorial chemistry have greatly accelerated the synthesis of novel materials, characterization methods have not kept up with this increased throughput, creating a bottleneck in materials development. To address these issues, high-throughput characterization methods have previously measured properties such as melting temperature, oxidation behavior, and electrical conductivity. However, measuring mechanical properties at high throughput is significantly more challenging, as existing methods are often limited by slow, complex fabrication steps or expensive and inaccessible custom instrumentation. Many such techniques already exist, including scanning nanoindentation, micromachined cantilever beams, microelectromechanical systems, microtensile testing, and microrheology. These methods can measure properties such as elastic modulus, hardness, thin film thermomechanical behavior, and ultimate tensile strength. For example, scanning nanoindentation can measure hardness and elastic modulus in a high-throughput manner, but it requires expensive and uncommon instrumentation. Microrheology has also been utilized to measure elastic modulus and viscosity at high throughput, but it requires complex custom instrumentation and is optimized for materials with a very low modulus or viscosity. Parallel microtensile testing can characterize mechanical properties in a high-throughput manner, but samples must be fabricated into a specific form and aligned precisely, limiting the overall throughput of the method. Moreover, many common experimental approaches rely on robotic measurement, but not all materials scientists have access to large capital equipment budgets or in-house automation support teams. A simple and widely-accessible high-throughput mechanical test that can quantitatively measure properties could significantly speed up the discovery and development of novel materials, enabling the masses to contribute to the new revolution in AI-based materials design.

Centrifugation is another technique that has been used for high-throughput testing via single-particle force spectroscopy, and more recently, in adhesive strength measurements of soft materials. (Y. Chen et al., ACS Cent. Sci., 2021, 7, 1135.)

Soft materials present an important target for high-throughput mechanical characterization. The mechanical properties of such materials are highly tunable, especially by adding extra components to form composites with enhanced properties. However, the presence of these additives significantly increases the number of possible formulations. More testing is required to fully explore the soft materials library. Sequence-specific polymers are another interesting class of soft materials that allow precise control of material properties by directly tailoring monomeric sequences. (A. J. DeStefano et al., JACS Au, 2021,1,155 6.) Fully unlocking the potential of these materials, however, requires a deep understanding of the sequence-structure-function paradigm, which again necessitates large-scale experimentation because the sequence space is exponentially large. (DeStefano et al., 2021.) Fortunately, the preparation of many soft materials is simple enough that samples across a wide range of compositions can be synthesized in a high-throughput manner. For example, automated pipetting systems have been shown to be effective at creating various hydrogels at high throughput. (Y. Ding et al., Adv. Funct. Mater., 2021, 31, 2100489; F. Xu et al., Biomacromolecules, 2020, 21, 214.) This synthesis technique takes advantage of the fact that post-treatment is often not necessary for soft materials, so gels of different compositions can quickly be fabricated by simply combining reactants in varying amounts. This is far simpler than the formation of composition gradients for hard materials such as alloys, which often requires very slow diffusion processing. Unfortunately, high-throughput studies of soft materials are frequently bottlenecked by the mechanical characterization step, which is often still performed with standard one-at-a-time testing. More accessible high-throughput characterization methods are necessary to keep up with the increased throughput of soft materials synthesis.

SUMMARY

Provided herein are systems for carrying out a colorimetric assay to measure bulk mechanical properties of gels and other soft materials. Also provided are methods of using the systems to carry out the colorimetric assay.

One embodiment of a method for measuring a bulk mechanical property of one or more soft materials includes the steps of: preparing one or more soft material samples in one or more sample wells, the one or more soft material samples comprising one or more solid particles embedded in a soft material; mounting the one or more sample wells in a centrifuge in an inverted configuration; spinning the one or more sample wells in the centrifuge in a series of increasing centrifugal velocity increments; and monitoring the one or more soft material samples after each centrifugal velocity increment to determine whether the one or more solid particles have broken through the soft material in the one or more soft material samples.

Other principal features and advantages of the disclosure will become apparent to those skilled in the art upon review of the following drawings, the detailed description, and the appended claims.

COLOR DRAWINGS

The patent or application file contains at least one drawing executed in color. Copies of this patent or patent application publication with color drawing(s) will be provided by the Office upon request and payment of the necessary fee.

BRIEF DESCRIPTION OF THE DRAWINGS

Illustrative embodiments of the disclosure will hereafter be described with reference to the accompanying drawings.

FIG. 6A shows a pre-determined pattern of material samples. 40 µL of polyacrylamide solution at the specified weight percent was added to each well. FIG. 6B shows images of experimental results of the full plate experiment. The plate is shown from the top after centrifugation cycles at different speeds, so particles were only visible once they broke out of the gel. Particles started at the bottom of the wells, so none were visible prior to centrifugation, and more particles in the pattern became visible at higher speeds. A post-processing algorithm was used to artificially color the particles green for better visibility.

DETAILED DESCRIPTION

Provided herein are systems and methods for carrying out high-throughput quantitative measurements of bulk mechanical properties of soft materials. Also provided are methods of using the systems to carry out the measurements. The systems include a centrifuge, solid particles, and sample wells. Because this equipment is common, relatively inexpensive, and widely commercially available, the systems and methods are widely accessible. In addition, because the methods can dramatically cut down on the time required to measure bulk mechanical properties of large sets of soft materials, the methods can be used to significantly speed up the discovery and development of novel materials.

Figure 1:
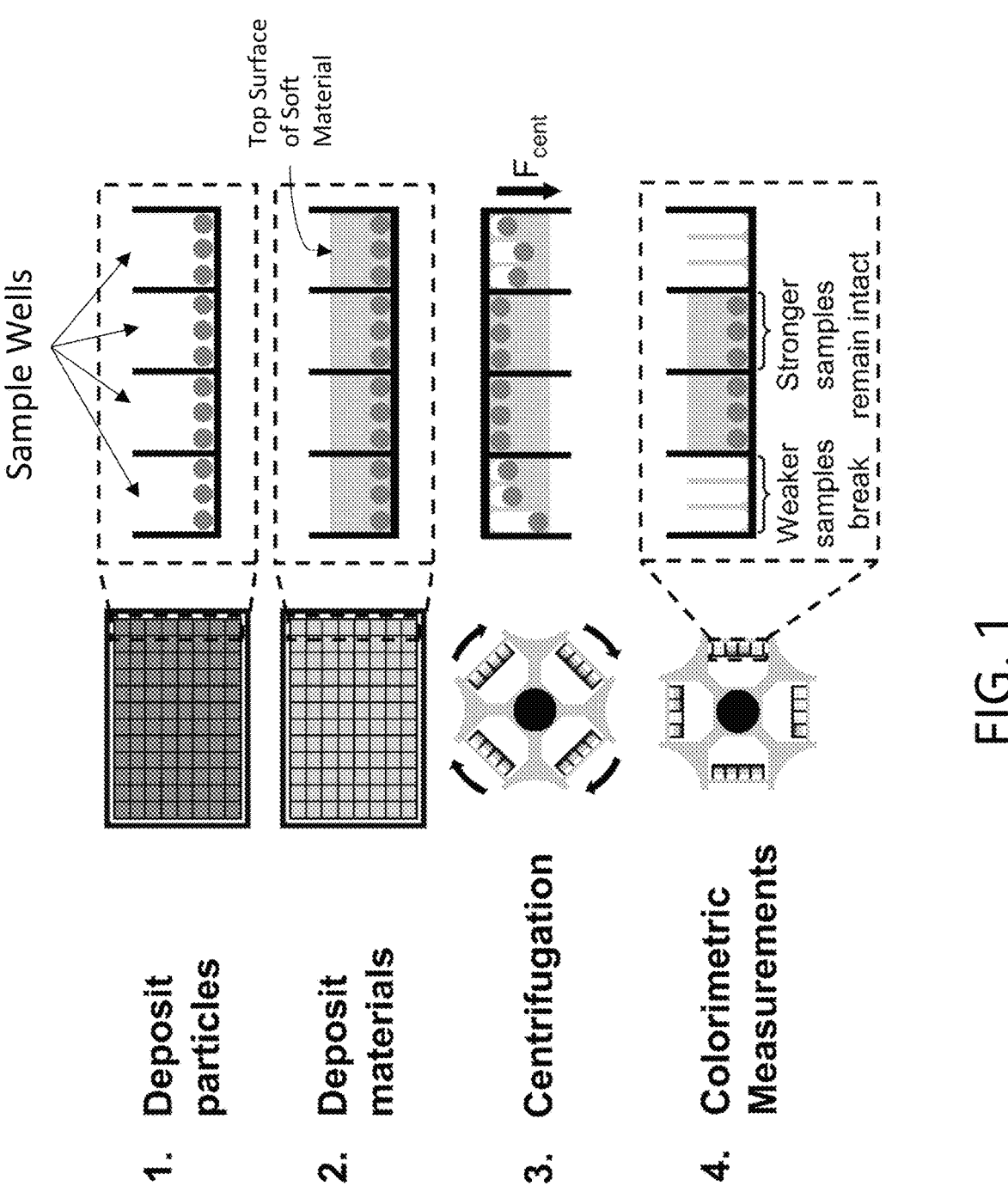
FIG. 1 shows a centrifugation method schematic. First, a single layer of particles was deposited in each well. Next, the material samples were deposited on top and solidified. The plate was then inverted and spun in a centrifuge, causing particles to break through the weaker materials. Larger centrifugation speeds will break stronger materials, enabling measurements of bulk mechanical properties that can distinguish between different materials.

One embodiment of a system that can be used to measure bulk mechanical properties of a soft material is shown in FIG. 1. The measurements can be carried out on one or more soft material samples in one or more sample wells, where a soft material sample includes one or more solid particles (for example, round beads) embedded within a soft material. As used herein, the term "sample well" refers generally to a container for holding a soft material and, while the sample well should have dimensions that enable it to be mounted in a centrifuge, the term "well" does not denote any specific shape or size. Because the systems and methods are designed for high-throughput measurements on many samples, multi-well plates of the type conventionally used for high-throughput experiments are a practical choice for use as the sample wells. Step 1 of FIG. 1 shows a top view (center) and a cross-sectional side view (right) of a plurality of sample wells in a multi-well plate.

The preparation steps for the soft material samples are relatively simple and do not limit the throughput of characterization. The soft material samples are prepared by depositing one or more solid particles (grey circles) in the sample wells (Step 1, FIG. 1). The particles are desirably, but not necessarily, deposited in a single layer at the bottom of each sample well. Next, the solid particles are covered with a soft material, such that the particles at the bottom of the well are embedded in the soft material (Step 2, FIG. 1). For the purposes of this disclosure, solid particles are embedded in a soft material if the soft material is thick enough to completely cover the particles in the sample well—that is, the solid particles do not break though the top surface of the soft material in the prepared samples, as shown in Step 2 of FIG. 1. The one or more sample wells are then mounted in a centrifuge in an inverted configuration (Step 3, FIG. 1), where an "inverted configuration" is a configuration in which the top surface of the soft material faces away from the center of rotation of the centrifuge, as shown in Step 3 of FIG. 1.

The multi-well plate is then centrifuged in a series of higher and higher rotational velocity increments. The centrifugation applies a homogeneous force across the soft material samples in the sample wells of the multi-well plate, and this centrifugal force pulls on the solid particles embedded in the soft material away from the bottom of the well and toward the top surface of the soft material (Step 3, FIG. 1), eventually causing the solid particles to break through the soft material (Step 4, FIG. 1). After each centrifugal velocity increment, the sample wells are monitored to determine in which samples the solid beads have broken through the soft material. The presence and locations of the particles may be monitored, for example, by observation with the naked eye, either as the measurements are being conducted or by visual inspection of images, such as digital photographs, taken of the sample wells after each of the centrifugal velocity increments. Images of the particles may be monitored during the centrifugation process by installing a camera inside the centrifuge. In some embodiments of the methods, colorimetric monitoring may be used. For example, a plate reader can be used to measure an absorption or fluorescence spectra of all the wells in the multi-well plate.

The solid particles in weaker soft materials will break though the soft material at a lower centrifugal velocity than the solid particles in stronger soft materials. Therefore, the centrifugation can distinguish between different soft materials of varying strengths, and the magnitude of the centrifugal force at fracture (i.e., the centrifugal force required to pull the particles out of the soft material) provides a quantitative measurement of a bulk mechanical property of the soft materials. For example, as illustrated in the Example below, the methods can be used to measure the fracture stress and/or shear modulus of a soft material. Fracture stress measurements obtained using the present systems and methods are comparable to those obtained using a rheometer. The mechanical properties can be measured with a very high sample throughput. By way of illustration, 100 or more, 1000 or more, or even 10000 or more soft material samples can be tested simultaneously in a single run. Such high-throughput runs may be carried out using one or more standard 384-well plates and/or one or more 1536-well plates. The upper limit of the number of samples in each run can be increased by using a centrifuge rotor that can hold larger or a greater number of sample wells.

The number, duration, and velocities of the centrifugal velocity increments used in a run will depend on the soft materials being tested. However, the methods generally can be carried out rapidly using short increments. In some embodiments of the methods, the duration of the velocity increments is in the range from 30 seconds to one minute, and in some embodiments of the methods the velocities are selected to generate centrifugal forces in the range from 250 g to 5000 g. However, durations and forces outside of these ranges can be used. The number of velocity increments will typically correspond to the number needed for all of the particles to break through the soft material in each soft material sample being tested.

The systems and methods described herein can be used to measure bulk properties of virtually all soft materials, where the term "soft material" refers to materials whose mechanical modulus is no greater than 1 GPa, where the mechanical modulus refers to the mechanical modulus at the temperature of the soft material during the measurement. This temperature may be, but is not necessarily, room temperature (~23° C.). The soft materials may be organic or inorganic soft materials. Examples of soft materials that can be tested using the systems and methods include, but are not limited to, gels, including hydrogels and organogels, colloids, elastomers, including rubbers (elastomers made from natural materials), and liquid crystals. Hydrogels are polymer networks in which pores are filled with water and organogels are polymer networks in which pores are filled with organic liquids. Non-limiting, illustrative examples of organic polymers from which the soft materials may be comprised include poly(alkyl acrylates) (e.g., poly(methyl acrylate), poly(ethyl acrylate), and poly(butyl acrylate)), poly(alkyl methacrylates) (e.g., poly(methyl methacrylate; PMMA)), polyacrylamides (PAMs), poly(alkylenes) (e.g., poly(ethylene) and poly(propylene)), poly(alkylene) glycols (e.g., polyethylene glycol; PEG), and alginates. The polymers may be homopolymers or copolymers comprising two or more different monomers, and the copolymers may be random copolymers, block copolymers, including diblock and triblock copolymers, or sequence-specific copolymers. More information about some types of sequence-specific polymers can be found in DeStefano, Audra J., Rachel A. Segalman, and Emily C. Davidson. "Where biology and traditional polymers meet: the potential of associating sequence-Defined polymers for materials science." Jacs Au 1.10 (2021): 1556-1571, the contents of which are incorporated herein for the purpose of providing illustrative examples of sequence-specific polymers. Specific illustrative examples of organic gels include PMMA-containing gels, PEG-containing gels, PAM-containing gels, alginate gels, and agar gels. Examples of inorganic gels and elastomers include silica gels and silicone elastomers, respectively.

The soft materials may be composite materials, which are composed of multiple components that are blended together. In these materials, small particles such as silica, carbon black, graphene, carbon nanotubes, clays, wood, etc. are dispersed within the soft material.

The centrifuge-based systems and methods can test a wide range of different soft materials at once, including soft materials that differ in form (e.g., elastomers and gels) and/or in chemical composition (e.g., soft materials comprising different types of polymers). Additionally, the systems and methods can be used to test soft materials having the same basic chemical composition but different properties (e.g., gel samples with different crosslinking densities or soft material composites comprising different filler particles).

The soft materials can be added to the sample wells using simple procedures. For example, a soft material can be heated to form a liquid phase and the liquid can be added to the sample well and allowed to solidify around and over the solid particles. Alternatively, reactive precursors that form a material can be added to a sample well where they react to form a solid soft material. Precursors include chemical components such as monomers, oligomers, and/or polymers and crosslinking agents. One or more of these components can be added to a sample well in liquid form or in an aqueous or organic solution where they react to form the soft material.

The bulk mechanical property measurements are substantially independent of particle size and density. Therefore, the solid particles used in the methods can be made from a wide range of materials and can have various shapes and sizes, provided they are dimensioned such that one or more of the particles can fit into the sample well. For a typically commercially available multi-well plate, solid round beads with diameters in the range from about 0.3 mm to about 2 mm are suitable. By way of illustration only, the particles, including round beads, can be metal particles, such as steel (e.g., stainless-steel) particles, or ceramic particles, such as tungsten carbide or yttria-stabilized zirconia particles.

EXAMPLE

This example demonstrates the measurement of the mechanical properties of soft materials using centrifugation to apply a uniform force to a soft material. The results demonstrate that this technique is not just a screening tool, but can quantitatively measure modulus and fracture strength with an accuracy comparable to more standard methods.

This example illustrates the use of the present methods for the measurement of mechanical properties using poly(methyl methacrylate)-poly(n-butyl acrylate)-poly(methyl methacrylate) (PMMA-PnBA-PMMA) triblock copolymer gels and particles of varying density and size. To better understand the fracture mechanism in this test, a similar scenario was investigated where a particle attached to a wire was physically pulled out of a gel. Using this experiment as a starting point, an analytical solution was presented that indicated that this method can measure the shear fracture stress of soft materials. This theory was then tested by comparing the results from this method to those from a standard rheometer test, demonstrating excellent agreement for two different materials systems. Finally, this method was performed on a full 384-well plate to illustrate its significantly increased throughput over standard tests.

Results and Discussion

This method utilizes centrifugation to apply a homogeneous force across hundreds of samples on a multi-well plate. The centrifugal force pulls on the particles embedded in each sample, eventually causing them to break through the gel. The magnitude of centrifugal force at fracture can then be used as a metric for the bulk mechanical strength of the corresponding material. The basic concept is demonstrated on poly(methyl methacrylate)-poly(n butyl acrylate)-poly(methyl methacrylate) (PMMA-PnBA-PMMA) triblock copolymers dissolved in 2-ethylhexanol. At room temperature, this is a good solvent for PnBA but a poor solvent for the PMMA end blocks, which thus serve as physical cross-links that form a gel. Above 90° C., PMMA becomes soluble and the gel becomes a liquid, allowing for pipetting hot solution into the well plate before it solidifies at room temperature. (M. E. Seitz et al., Macromolecules, 2007, 40, 1218.) This material was chosen because its mechanical properties can be tuned by simply adjusting the concentration of the copolymer in the solvent. Additionally, this material is highly adhesive, enabling it to stick to the well plate and not detach during centrifugation.

Figures 2A, 2B:
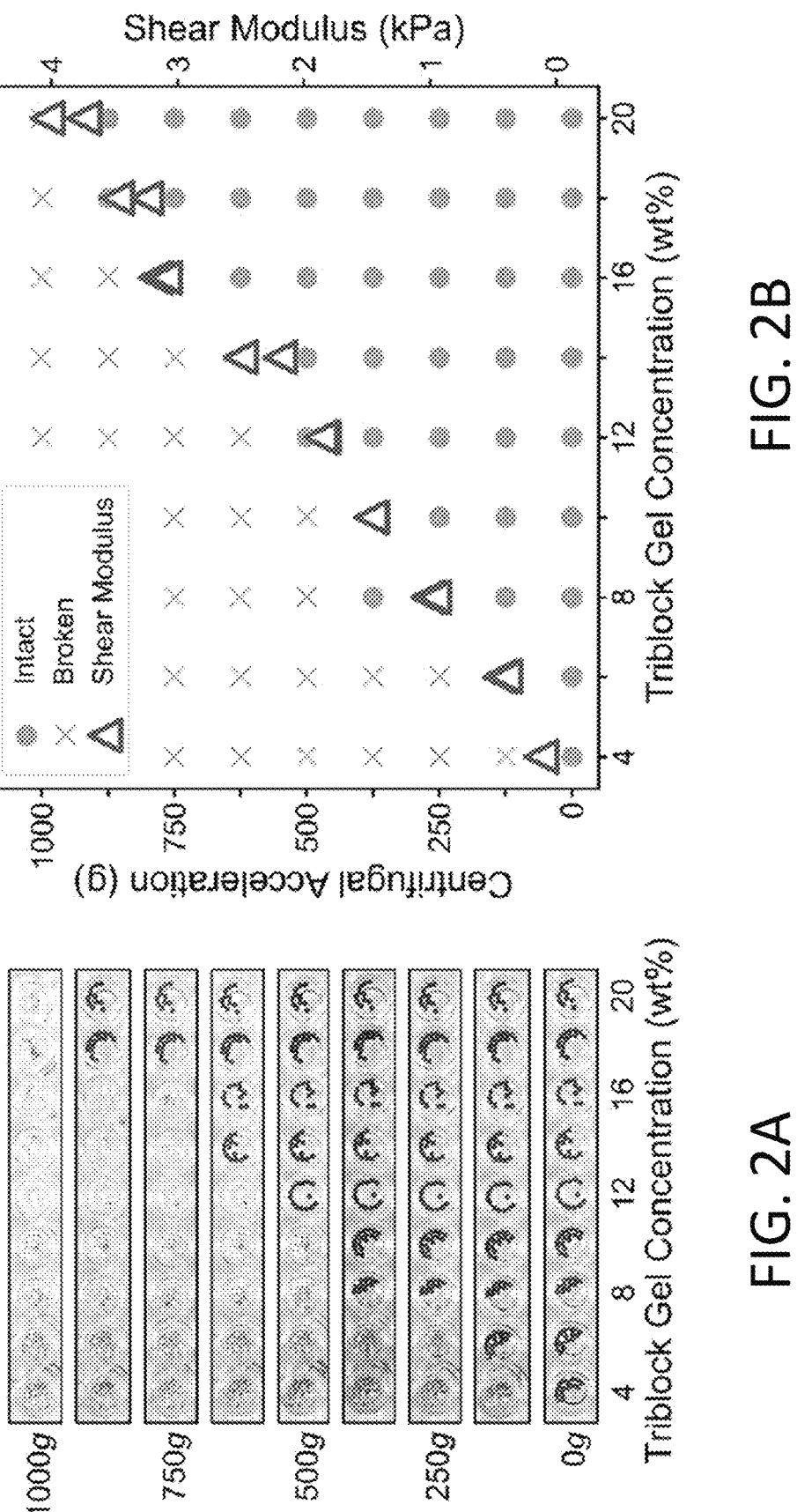
FIG. 2A shows images of a centrifugation experiment with 1 mm diameter tungsten carbide particles embedded in PMMA-PnBA-PMMA gels at various concentrations. 100 µL of triblock gel solution was added to each well. The same row in the well plate is shown from the bottom of the plate after cycles at increasing speeds. When a sample fractured, the particles broke through to the top of the well plate and are thus not visible in subsequent photos.
FIG. 2B shows a graphical representation of data in FIG. 2A along with shear modulus of the same triblock gels. Centrifugal results were interpreted in a binary fashion, with "intact" meaning that the majority of the particles were still inside the gel at the specified speed and "broken" meaning that the majority had broken out of the gel.

The preparation steps in this method are relatively simple and do not limit the throughput of characterization. First, a single layer of particles was deposited at the bottom of each well on the plate. Then, triblock gel solutions of varying concentrations were heated and pipetted into each well, and then they were allowed to cool and solidify around the particles. After the samples solidified completely, the plate facing outwards was centrifuged multiple times at successively increasing speeds. After each speed, the well plate was removed from the centrifuge, photos of the plate were taken, and then it was returned to the centrifuge for the next speed. The results show that centrifugation can distinguish between materials of varying strengths, validating the feasibility of this method for measuring bulk mechanical properties (FIGS. 2A-2B).

It was observed that when one particle broke through a sample, the rest of the particles in that well would usually break through all at once. Thus, the critical centrifugal speed was defined as the midpoint between the highest speed at which a sample was intact and the speed at which most of the particles broke through the sample. Critical centrifugal speed was observed to be independent of the duration of centrifugation above ~30 seconds. To investigate whether the number or location of particles in a well had any effect on the critical centrifugal speed, results from several particles in a flat-bottomed well were compared to results obtained from a single particle in the center of a U-shaped well. The critical centrifugation speed was consistent across both scenarios, which illustrates that the number and location of particles in each well is not significant.

Figure 3B:
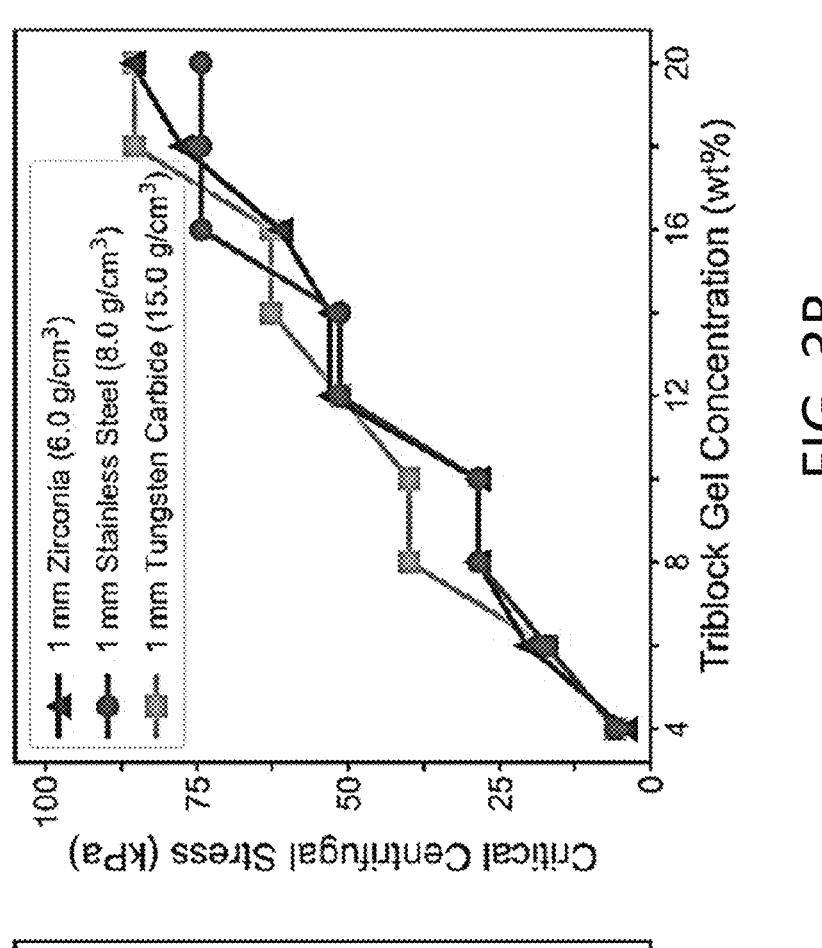
FIGS. 3A-3B show critical centrifugal stress (Equation 1) for different gel concentrations, with particles of different diameters (FIG. 3A) and densities (FIG. 3B). Results were consistent across different particle types. Centrifugation was performed in a 96-well plate, and 100 µL of triblock gel solution was added to each well.
Figure 3A:
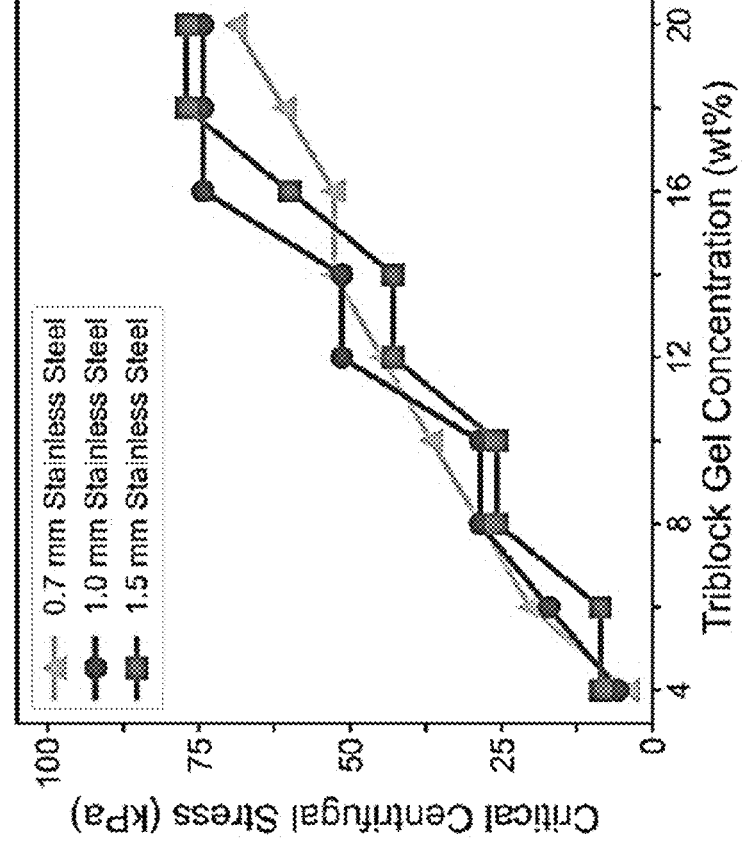

To correlate the results to those from more classical mechanical tests, they were compared to related mechanical properties. A serendipitous correlation was observed between the shear modulus of the triblock gel measured by oscillatory rheology and the centrifugal acceleration at which that gel fractures (FIG. 2B). To determine the origin of this correlation, it was first hypothesized that the correct metric for the material strength is the centrifugal force at break normalized by the particle's cross-sectional area, i.e., a "centrifugal stress,"

$$\sigma_{cent} = \frac{F_{cent}}{A} = \frac{\frac{4}{3}\pi R^3 a_{cent}\Delta\rho}{\pi R^2} = \frac{4}{3}Ra_{cent}\Delta\rho \qquad (1)$$

where R is the particle radius, $\Delta\rho$ is the difference between the densities of the particle and the gel, and $a_{cent}$ is the centrifugal acceleration. To test this hypothesis, the centrifugation experiment was repeated while varying the size and density of the particles. There was excellent agreement of critical centrifugal stress across different particle sizes and densities over almost an order of magnitude (FIGS. 3A-3B). This demonstrates that critical centrifugal stress is the correct metric for interpreting the results because it normalizes for the particle size and density, allowing for direct measurement of the material's inherent strength.

Figures 4A, 4B:
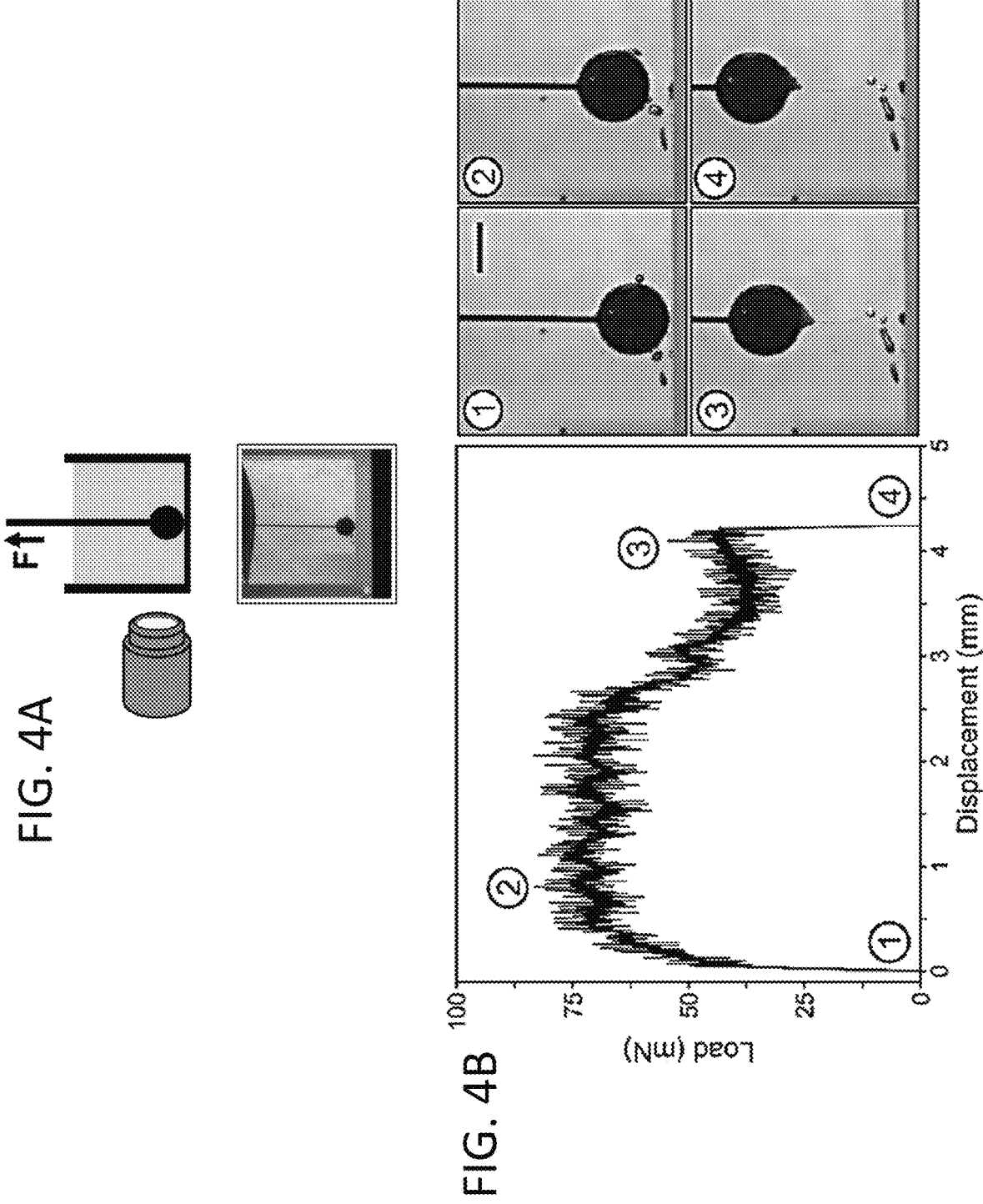
FIG. 4A shows a diagram of a particle pulling experiment with a full camera image shown before pulling began.
FIG. 4B shows a load-displacement curve for a particle pulling experiment after wire load was subtracted from total load. A 15 mm tall 10 wt. % triblock gel in a small glass container was used for this experiment, with a 3 mm diameter stainless steel particle starting at the bottom surface. Zoomed-in images are shown for the starting point, when the force plateaued, just before fracture, and just after fracture. The scale bar is 2 mm, and all images are at the same magnification.

To investigate the mechanism of gel fracture in the centrifugation method, a similar experiment was set up in which a particle was physically pulled out of a gel using a thin wire (FIGS. 4A-4E). As the wire was connected to an inchworm motor, load transducer, and optical sensor, the force and displacement could be directly measured during the pulling process. A side camera also enabled visual monitoring. To estimate the forces on the particle alone, a control experiment was run consisting of a wire with no particle. After subtracting the load of this control experiment from the total load, it was found that the force on the particle increased nonlinearly from zero, when the particle was at the bottom, to a plateau value (FIG. 4B). This plateau was reached at a displacement of ~0.5 mm for a 3 mm diameter particle, and the force eventually fell off when the gel completely fractured.

Direct quantitative comparison of pulling the particle using a wire vs. centrifugation was difficult because of a few issues. Generally, it was observed that adhesion of the gel to the wire contributed between 60% and 85% of the total measured load at fracture. Even after subtracting the wire's adhesive force, the pulling force drastically underestimated the centrifugal force that one would expect for a particle of similar size and density. To explain this, it was hypothesized that the wire generated a pathway of broken gel that the particle easily tunneled through as it moved up, while the gel above the particles was pristine in the centrifugal experiment. The presence of the wire thus limited the quantitative results that can be drawn from this experiment.

Nevertheless, the wire pulling experiment contributed an important insight into the analysis of the mechanics of centrifugation. While the plateau in pulling force did not quantitatively match the centrifugal results, it did correspond to when the particle experienced its maximum force, which only occurred when the particle was a considerable distance away from the bottom surface. This suggests that if a particle begins at the bottom surface, the critical centrifugal force at break should be the same as if the particle had begun far away from the bottom. While this specific comparison could not be performed in the centrifugal test, the thickness of the gel was instead varied above the particles on the bottom surface of the well plates. It was found that as this thickness increased above a few particle diameters, the results were generally insensitive to the thickness (until it was so large that the centrifugal force exceeded the tensile strength of the gel, and the gel itself broke out of the well plate). This is all consistent with the same picture: a particle that begins at the bottom of the well plate must eventually move up, through the entire gel, before it breaks out. The critical centrifugal stress for a particle starting at the bottom surface should thus be identical to that of a particle in an infinitely large gel.

Figures 4C, 4D, 4E:
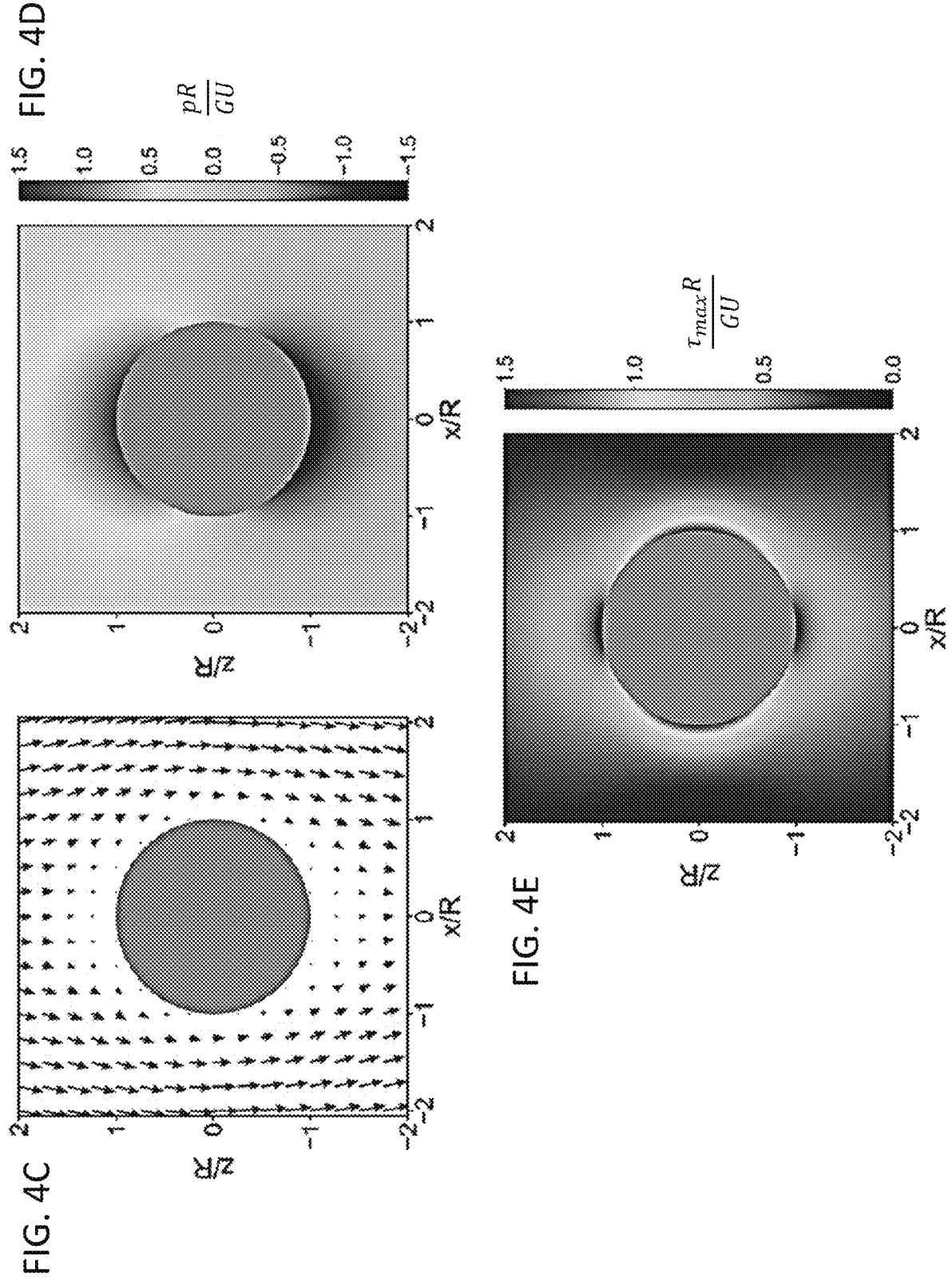
FIGS. 4C-4E show an analytical solution for the displacement field (FIG. 4C), pressure (FIG. 4D), and maximum shear stress (FIG. 4E) around particle that has moved a distance in the +z direction in an infinite medium, in the frame of reference of the particle.

The stress and strain fields associated with a force exerted on a solid sphere in an infinite elastic medium have a well-known analytical solution. From the frame of reference of a particle of radius R that has moved a distance U in the +z direction (up), the deformation field (FIG. 4C) in the surrounding medium is given by, $$u_r(r, \theta) = -U\cos\theta\left(1 - \frac{3}{2}\left(\frac{R}{r}\right) + \frac{1}{2}\left(\frac{R}{r}\right)^3\right) \quad (2)$$

$$u_\theta(r, \theta) = U\sin\theta\left(1 - \frac{3}{4}\left(\frac{R}{r}\right) - \frac{1}{4}\left(\frac{R}{r}\right)^3\right),$$

using a cylindrical coordinate system where r represents the radial distance from the center of the particle and $\theta$ represents the angle from the +z direction (up). The force on the particle is given by, $$F = 6\pi GRU, \quad (3)$$

where G is the shear modulus of the medium. Here it was assumed that the medium was incompressible, and so by the correspondence principle of viscoelasticity, this situation was identical to the familiar fluid mechanics problem of Stokes flow around a sphere. (A. C. Pipkin, Lectures on Viscoelastic Theory, Springer-Verlag; New York, 1986; E. M. Furst and T. M. Squires, Microrheology, Oxford University Press, 2017; W. M. Deen, Analysis of Transport Phenomena, Oxford University Press, 2011.) Prior to failure, the upward force on the sphere from centrifugation was exactly counterbalanced by a downward force that had contributions from the hydrostatic pressure (FIG. 4D) and shear forces at the sphere's surface. As pressure does not cause failure unless it reaches the regime of cavitation, failure was investigated by only considering the shear stress, and the maximum shear stress experienced throughout the medium was plotted, given by, $$\tau_{max} = \frac{1}{2}|\sigma_{max} - \sigma_{min}| \quad (4)$$

where $\sigma_{max}$ and $\sigma_{min}$ are the largest and smallest principal values of the stress tensor (FIG. 4E). Note that this is the measure used in the familiar Tresca yield criterion. (R. M. Jones, Deformation Theory of Plasticity, Bull Ridge Publishing, 2009.) It was observed that there were local maxima above and below the particle at positions r=√2R, where the gel experienced uniaxial compression and tension, respectively. Notably, the highest stress regions occurred closest to the sphere's surface at the equator ($\theta=90°$), where the deformation mode was simple shear. Although this conclusion was reached by examining the Tresca stress measure, it was noted that the stress at these regions was much higher than anywhere else in the material, so selecting other failure criteria will ultimately result in the same conclusion. Therefore, during centrifugation the gel first broke near the equatorial surfaces.

Because the point of failure occurred at a region experiencing simple shear, the correct mechanical property corresponding to the critical centrifugal stress can be potentially determined by comparing the stress fields to a shear rheology experiment. The shear stress at the equatorial surfaces is given by, $$\sigma_{r\theta} = 2G\varepsilon_{r\theta} = G\left(\frac{1}{r}\frac{\partial u_r}{\partial \theta} + r\frac{\partial}{\partial r}\left(\frac{u_\theta}{r}\right)\right)\Big|_{r=R,\theta=90°} = \frac{3GU}{2R} \quad (5)$$

The failure criterion occurs when this shear stress exceeds the critical stress at fracture measured by a shear rheometer, $\sigma_{r\theta} > \tau_{crit}$, i.e. Bingham number is less than unity. After applying eqn. (3) and (5) to this inequality, the criterion becomes, $$\frac{3G}{2R}\left(\frac{F}{6\pi GR}\right) > \tau_{crit} \quad (6)$$

$$\frac{F}{\pi R^2} > 4\tau_{crit}.$$

Note that the left side of this inequality is simply the centrifugal stress (eqn. (1)), $$\sigma_{cent} > 4\tau_{crit} \quad (7)$$

This centrifugal experiment is thus a quantitative measurement of the fracture stress as measured on a shear rheometer, and this inequality predicts a quantitative mapping between the two techniques.

Figures 5A, 5B:
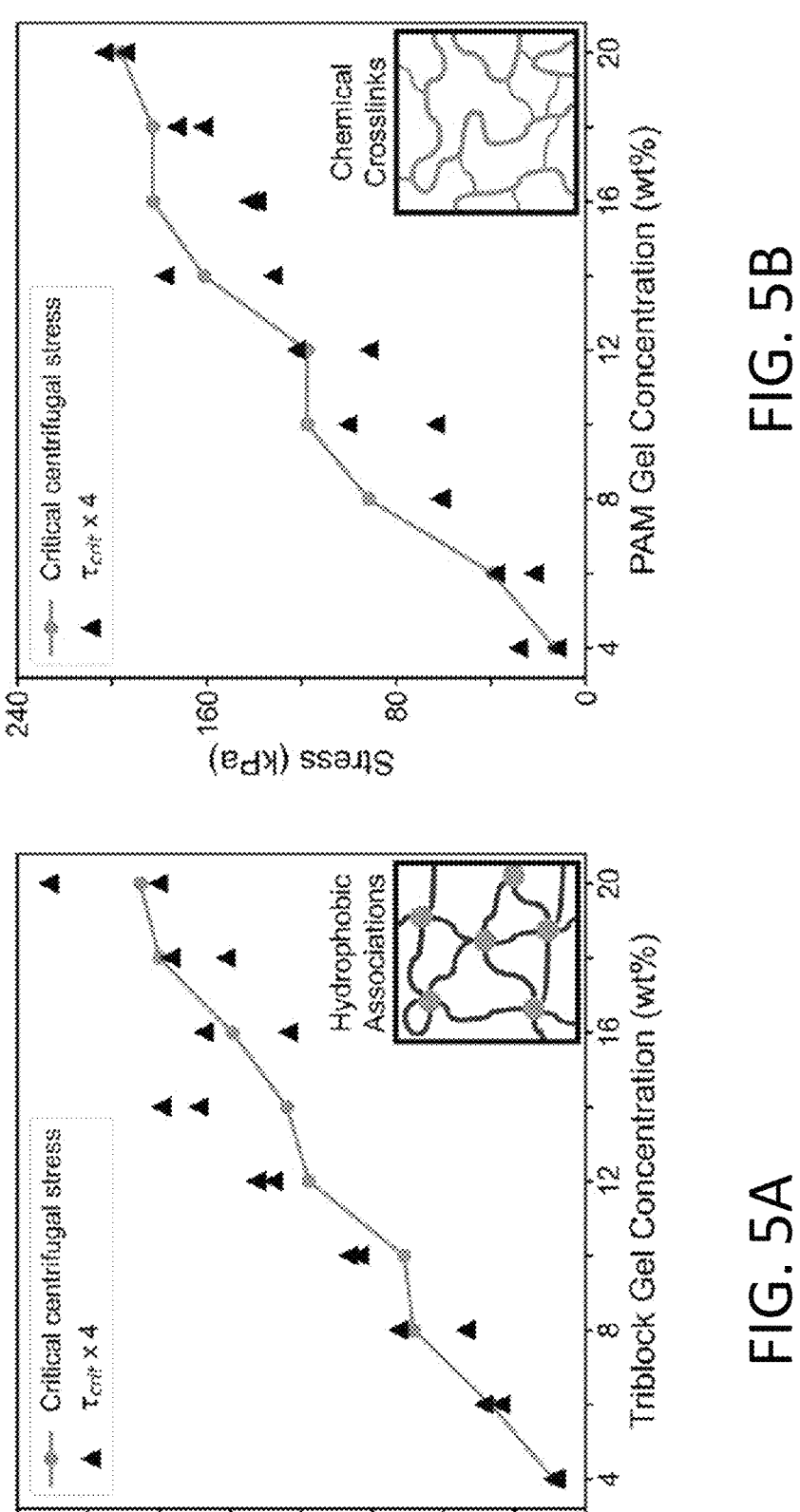
FIGS. 5A-5B show correlation of critical centrifugal stress to shear fracture stress for triblock gel (FIG. 5A) and PAM gel (FIG. 5B). Centrifugation for triblock gel was performed with 1 mm diameter stainless steel particles in a 96-well plate with 100 µL of triblock solution added to each well. Centrifugation for PAM gel was performed with 1 mm diameter stainless steel particles in a 384-well plate with 40 µL of PAM solution added to each well. Fracture stress was measured by linearly ramping up the strain in continuous rotation of a parallel plate geometry and recording the maximum stress at break.

This key prediction can be tested by performing shear rheology on triblock gels over the same range of concentrations as in the centrifugal experiment. (Furst and Squires, 2017.) The centrifugal method was interpreted as a quasistatic test, as stress was ramped up during startup until fracture occurred at maximum stress. Because of this, the centrifugal results were compared to those from a static shear stress growth rheology experiment. It was found that the critical $\sigma_{cent}$ values from FIGS. 3A-3B are readily superimposable with the results from the rheometer, linearly shifted by the factor of 4 from eqn. (7) (FIG. 5A). This agreement is remarkable and worth additional emphasis, as the prediction from the analysis was confirmed with no fitting parameters, and the centrifugal test indeed quantitatively measured the shear fracture stress of the gels. To further confirm this, both centrifugal and shear rheology tests were performed over a range of hydrogels composed of chemically crosslinked polyacrylamide (PAM). This new system was selected as a completely different category of soft material compared to the triblock gels, using water vs. organic solvents, crosslinked through covalent bonds vs. physical associations, and containing different microstructures and fracture mechanisms. However, the agreement between the two techniques was similarly striking in the PAM hydrogels (FIG. 5B), confirming that the centrifugal method and its analysis are extremely robust, even for quantitative measurement.

There should be no debonding between the gel samples and the bottom of the well plate when the methods are being carried out. If debonding were to occur, failure would be observed at an artificially low centrifugal speed because the particles would never penetrate through the gel. Several scenarios could potentially cause debonding or similar behavior. Larger amounts of sample in each well may result in larger centrifugal forces at the sample-plate interface, causing adhesive failure at the interface or cohesive failure in the material if this force exceeds the tensile strength of the gel. Pains were taken to avoid this in these experiments. An excessive number of particles could also cause debonding by adding to the sample mass during centrifugation and potentially introducing unnecessary defects at the sample-plate interface. This effect was investigated by confirming that the critical centrifugal stress was similar for a single particle in a well vs. several particles. Finally, debonding would be problematic if there is poor adhesion between the materials comprising the sample and the well plate. In the triblock gel system, this material naturally adhered to common polypropylene plates, and no debonding was observed.

To avoid debonding during centrifugation of the PAM hydrogels, separable glass-bottomed plates were used, which were surface-functionalized with methacrylamide groups that covalently bond with the network. This solution is widely applicable to other classes of soft materials, as other functionalization schemes could be easily adapted by choosing a silane coupling agent that can bond to the chosen material. For some systems, storing the functionalized plates in a cool, dry environment is required to ensure long-term stability of surface treatment. Using high-density particles such as stainless steel or tungsten carbide may be optimal, because the acceleration required to cause fracture is lower, so there is less occurrence of debonding. Moreover, because material fracture occurs rapidly when the critical centrifugal stress is exceeded, it is recommended to utilize short centrifugation periods (30 seconds or less) to avoid placing unnecessary excess stress on the point of adhesion to the plate. While pains were taken to avoid debonding of the PAM hydrogel at the bottom of the well plate through surface functionalization, no such effort is necessary for the surface of the particles. This is because the shear stress in the material is maximized at the interface with the spheres at the equatorial region (FIG. 4E). Therefore, adhesive failure at the particle-gel interface is indistinguishable from cohesive failure, which would also occur at the same location. Centrifugation thus removes the particles from the material through decohesion.

Figures 5C, 5D:
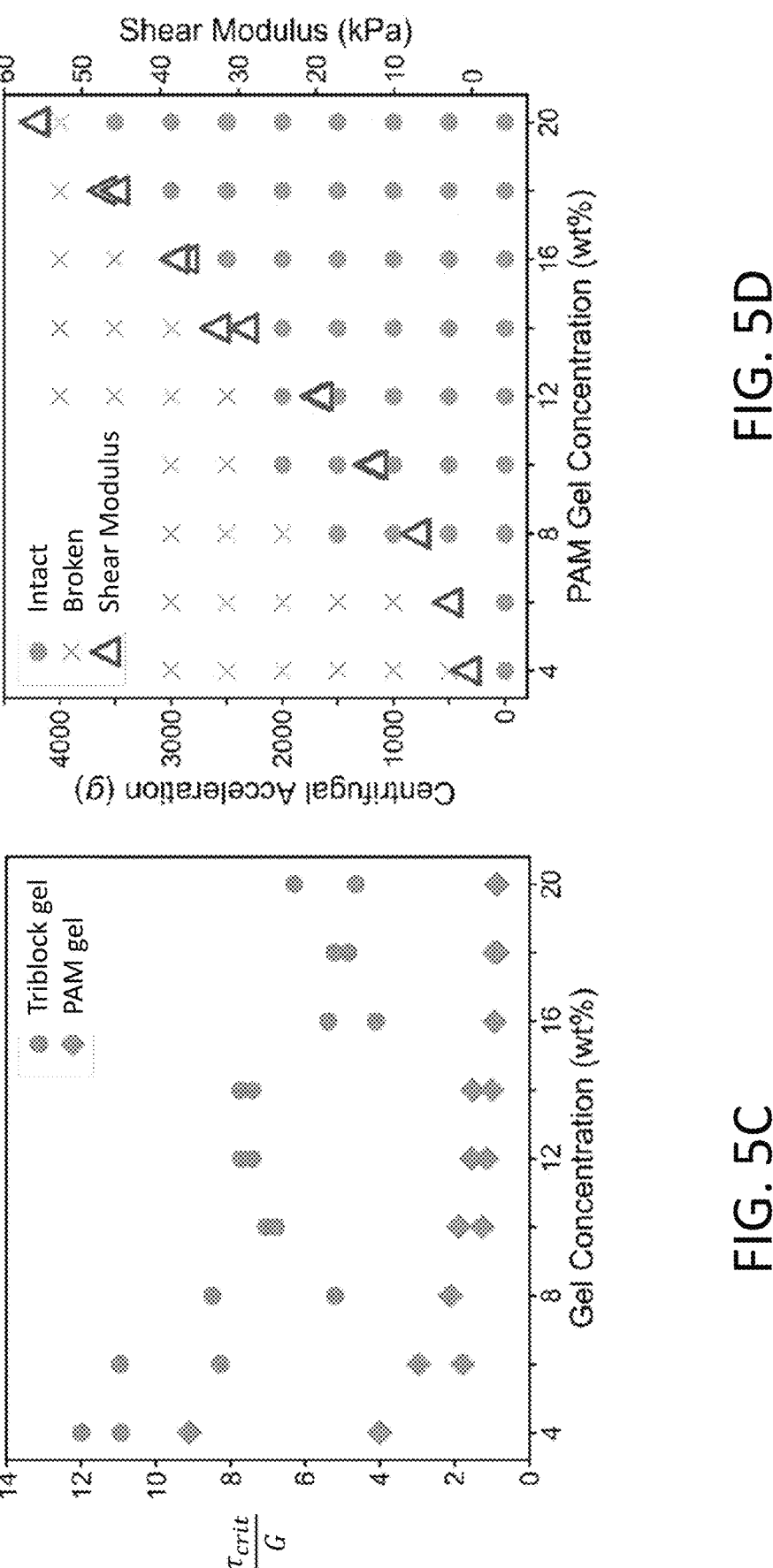
FIG. 5C shows fracture stress divided by the shear modulus for triblock and PAM gels.
FIG. 5D shows correlation between centrifugal results and shear modulus for PAM gel.

The serendipitous correlation with shear modulus in the triblock gels (FIG. 2B) can be explained by noting that the ratio of fracture stress to shear modulus at break (i.e., critical strain) in shear rheology happens to be relatively constant with concentration above a certain point (FIG. 5C). Specifically, $\tau_{crit}$~6G for triblock gels above ~8 wt %. A similar constant trend was observed in polyacrylamide for higher percentage gels, and thus the shear modulus correlates well to the centrifugal fracture stress in this system as well (FIG. 5D). Therefore, in cases where critical strain is constant, the centrifugal method can also be used as a measure of mechanical modulus, even though it quantitatively measures the fracture stress.

The quantitative agreement between eqn. (7) and FIGS. 5A and 5B implicitly assumes that shear stress at the point of failure (shown in FIG. 4E) directly leads to the actual force required to pull the particle out of the gel during centrifugation. This assumption deserves further analysis, particularly as the force to continue pulling the particle through the gel after initial failure, i.e., a propagation force, may also be significant. The propagation of this fracture process is equivalent to the puncture experiments of Fakhouri, et al. where an indenter with a spherical tip was pushed through identical triblock gels as in the experiment described herein. (S. Fakhouri et al., Soft Matter, 2015,11, 4723.) In that study, the indentation fracture stress was determined to be $\sigma_{indent}$~10G, where ° indent is defined as $F_{indent}/\pi R^2$, similar to eqn. (1) here. However, the study described herein determined the critical centrifugal stress was $\sigma_{cent}$~24G, as this is ~4 times the $\tau_{crit}$ shown in FIG. 5C for the triblock gels. As $\sigma_{cent}$ is significantly larger than $\sigma_{indent}$ which is equivalent to a propagation stress, it was confirmed that the stress to initiate failure dominated the fracture process, as expected. The centrifugal method thus measures $\sigma_{cent}$=4 $\tau_{crit}$ as has been defined.

This method can measure fracture stress over multiple orders of magnitude. Here, strong agreement was shown between 3 and 50 kPa for PAM hydrogels. However, it is possible to extend the dynamic range of this method even further by using higher density particles, larger particles, or higher centrifugal speeds. For example, a centrifugal test at 4700 g with 1.5 mm diameter tungsten carbide particles could reach a centrifugal stress of over 640 kPa, which could break much stronger gels.

Figures 6A, 6B:
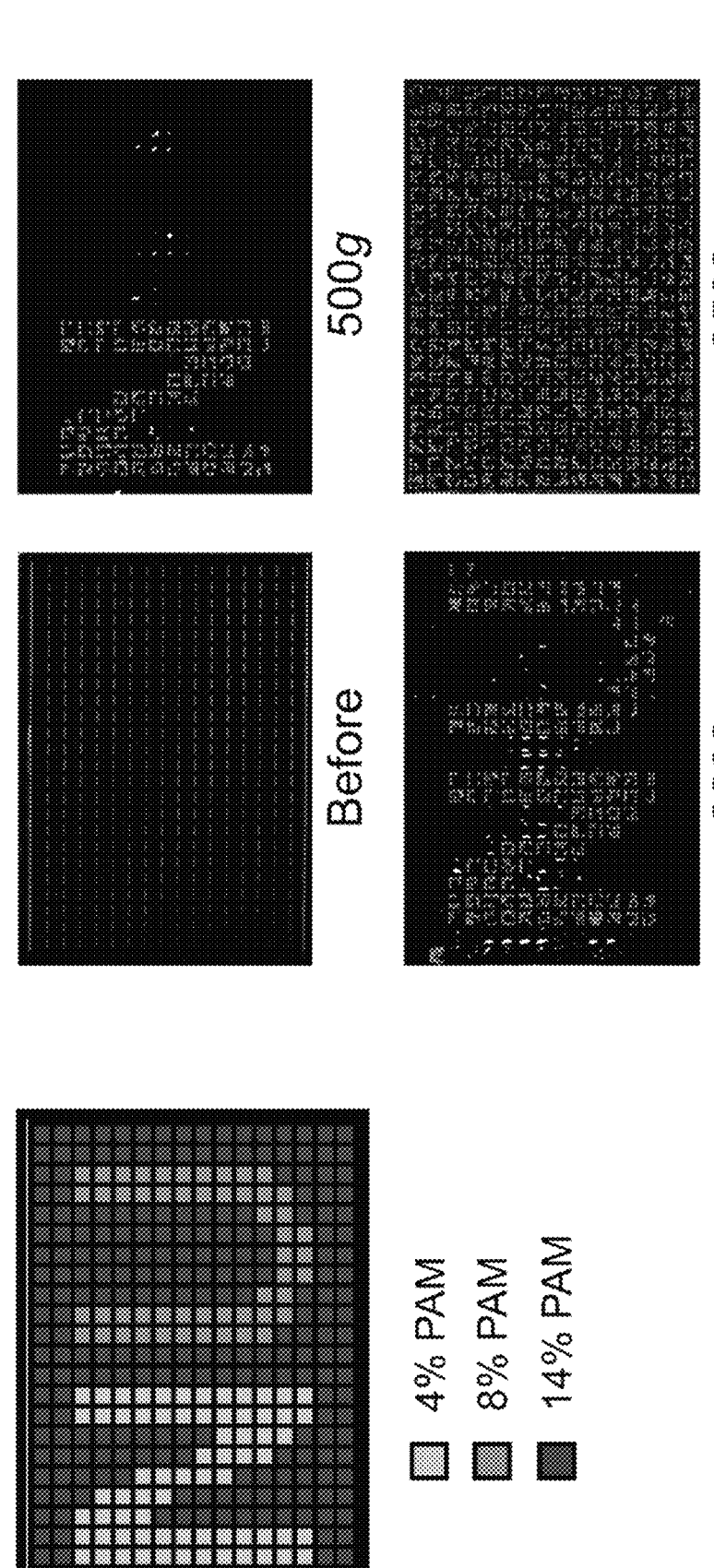
FIGS. 6A-6B show a full 384-well plate centrifugation experiment using 1 mm diameter stainless steel particles.

To demonstrate the high throughput of this method, a test was performed using every single well of a 384-well plate. Three different PAM concentrations with different strengths were deposited into a predetermined pattern, and then the plate was photographed from the top after multiple spins in the centrifuge (FIGS. 6A-6B). With four 384-well plates able to fit in the centrifuge, this method can characterize up to 1536 samples at once. Preparing samples and running a full centrifugation sweep across multiple speeds can take up to a few hours, dramatically improving the throughput of mechanical characterization. If more thorough data collection is required, this method can be followed up by classic mechanical testing on a smaller subset of the best performing candidates from this method. In this way, this method is well-suited to complement classic mechanical testing by offering the ability to quickly characterize large libraries of materials at once while requiring only common equipment and inexpensive consumables.

Methodology

Materials Synthesis

PMMA-PnBA-PMMA copolymer was obtained from Kuraray Co. and used as received. The molecular weight of the PMMA end blocks was 25,000 g/mol, the molecular weight of the PnBA midblock was 116,000 g/mol, and the polydispersity of the copolymer was approximately 1.16. Triblock copolymer was dissolved in 2-ethylhexanol solvent at 140° C. at the desired concentration and subsequently cooled to room temperature to solidify the resulting gels. Polyacrylamide gels of varying concentrations were prepared by diluting a 30 wt. % stock solution with a 37.5:1 ratio of acrylamide to bisacrylamide (Bio-Rad). Each polyacrylamide gel additionally contained 0.1 wt. % ammonium persulfate initiator (Bio-Rad) in water, and 0.077 wt. % tetramethylethylenediamine (TEMED, Bio-Rad). Polyacrylamide gels were left to react for 30 minutes before experimentation to ensure that gelation had finished.

Centrifugation

Stainless steel particles were purchased in diameters of 0.7 mm (Cospheric Inc.), 1 mm (MSE Supplies LLC), and 1.5 mm (Life Science Products). Tungsten carbide particles (1 mm diameter, MSE Supplies LLC) and yttria-stabilized zirconia particles (0.9-1.1 mm diameter, MSE Supplies LLC) were also purchased. For accurate and consistent results, it is necessary to add only a single layer of particles to each well in the plate. To accomplish this, particles were first poured into each well such that the bottom of the well was completely covered. A polypropylene adhesive plate seal (Thermo Fisher Scientific) was then attached to the top of the plate and the plate was inverted, causing a single layer of particles to stick to the adhesive. Next, this cover was removed, and the excess particles were poured out from the plate. The adhesive sheet was then put back on the well plate and the well plate was centrifuged at 4700 g for 30 seconds to get the particles to detach and fall back into the wells, resulting in a single layer of particles in each well.

Next, the material samples were added to the wells. PMMA-PnBA-PMMA samples were heated to 140° C. to allow pipetting, and polyacrylamide samples were pipetted immediately after the TEMED was added and before gelation occurred. For 96-well plates (Greiner CELLSTAR® 96 well plates), 100 μL of each sample was added to the well; for 384-well plates (PolyAn), 40 μL of each sample was added to the well. This resulted in a gel of height 2 mm above the 1 mm diameter particles in the 96-well plate, and a gel of height 2.6 mm above the 1 mm diameter particles in the 384-well plate. After depositing the samples, the plate was covered with a fresh adhesive sheet and left to sit for 30 minutes to allow the samples to solidify before centrifugation was performed.

Centrifugation was carried out in a benchtop centrifuge (Sorvall Legend XFR centrifuge with a TX-750 swinging bucket rotor, Thermo Scientific). After the samples solidified in the covered well plate, a photo was taken of the plate. Then, the plate was placed top-down in the centrifuge, such that the top of the well plate would face outwards while spinning. For the triblock gel with stainless steel particles, the plate was centrifuged at increments of 250 g up to 1750 g. For the polyacrylamide gel with stainless steel particles, the plate was centrifuged at increments of 500 g up to 4000 g. In both cases, the centrifuge was run for 30 seconds at each desired speed. After each spin, the plate was removed, and photos were taken of the plate to document the state of each sample. The speed was increased incrementally until all samples were broken.

Particle Pulling

Particle pulling was performed using a custom apparatus as described in Wang et al. (Q. Wang et al., Macromolecules, 2020, 53, 6975.) A hole was drilled into a 3 mm diameter stainless steel particle, and a 0.01-inch diameter metal wire was then glued into the hole and connected to the piezoelectric stepping motor of the custom apparatus. The particle and wire were then lowered into a small cubic glass container until the particle was barely touching the bottom. PMMA-PnBA-PMMA triblock gel (7 mL) was heated to 140° C. until it liquefied and then it was poured into the glass container with the particle, resulting in a 15 mm tall gel. After waiting 15 minutes for the gel to cool and fully solidify around the particle and wire, the particle was pulled upwards at 20 μmss. The custom apparatus measured the displacement and force at each point using an optical sensor (Philtec) and a load transducer (Honeywell), respectively. The particle was pulled until the gel fractured, at which point a sharp decrease in force was observed.

Rheological Measurements

Rheological measurements were carried out using a stress-controlled rheometer (DHR-2, TA Instruments, New Castle, DE) at 25° C. with a 25 mm parallel plate geometry with a 500 μm gap. The storage (G') and loss moduli (G") were recorded over a frequency range of 0.1-100 rad/s at 5% strain. Stress growth tests were conducted at 0.05 s$^{-1}$ to obtain the fracture stress and the critical strain of each sample. The fracture stress and the critical strain were recorded at the highest stress reached during the test. Prior to loading the triblock samples, the samples were heated on a hot plate at 155° C. for at least 20 minutes, and the Peltier plate of the rheometer was set to be 95° C. Samples were then loaded on the rheometer and the geometry gap was set to be 500 μm initially. The Peltier plate was then set to be 25° C. and the axial force control was activated while cooling to compensate for thermal shrinkage. Testing on triblock gels began 10 seconds after the sample reached 25° C. PAM gel samples were made in situ on the Peltier plate and cured for 30 minutes before testing. Initiator and catalyst were first added to vials containing monomer solutions and mixed before loading on the rheometer. The geometry gap was set to be 500 μm initially, and the gel formed at 25° C. with axial force control activated.

Surface Functionalization

Separable well plates were purchased from PolyAn and Grace Bio Labs. This allowed for the functionalization of the glass bottom separately before the plastic wells were attached on top. (3-methacrylamido)triethoxysilane (Gelest) was used as a silane coupling agent for the polyacrylamide gel. First, the glass bottom of the 384-well plates was heated in Piranha solution at 80° C. overnight. Following this, the glass was removed from the solution, rinsed with deionized $H_2O$, and dried thoroughly. The glass was then submerged in silane coupling agent (5 vol. %) in toluene (95 vol. %) and heated again at 80° C. overnight. After this, the glass was removed from the solution, rinsed with acetone, and fully dried once more. The plastic wells were then attached to the glass plate bottom with pressure-sensitive adhesive, forming a tight seal.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for measuring a bulk mechanical property of one or more soft materials, the method comprising:

preparing one or more soft material samples in one or more sample wells, the one or more soft material samples comprising one or more solid particles embedded in a soft material;

mounting the one or more sample wells in a centrifuge in an inverted configuration;

spinning the one or more sample wells in the centrifuge in a series of increasing centrifugal velocity increments; and monitoring the one or more soft material samples after each centrifugal velocity increment to determine whether the one or more solid particles have broken through the soft material in the one or more soft material samples.

2. The method of claim 1, wherein the bulk mechanical property is fracture stress.

3. The method of claim 1, wherein the bulk mechanical property is elastic modulus.

4. The method of claim 1, wherein more than one of the soft material samples are prepared and monitored.

5. The method of claim 4, wherein at least 100 soft material samples are prepared and monitored.

6. The method of claim 4, wherein different soft material samples comprise different soft materials.

7. The method of claim 1, wherein the soft material of one or more of the soft material samples comprises an organic polymer.

8. The method of claim 7, wherein the soft material of one or more of the soft material samples comprises an organogel.

9. The method of claim 7, wherein the soft material of one or more of the soft material samples comprises a hydrogel.

10. The method of claim 7, wherein the soft material of one or more of the soft material samples comprises an elastomer.

11. The method of claim 1, wherein preparing the one or more soft material samples comprises placing the one or more solid particles into the one or more sample wells, adding a liquid comprising the soft material or comprising a precursor of the soft material into the one or more sample wells, and solidifying the one or more soft materials within the one or more sample wells.

12. The method of claim 1, wherein monitoring the one or more soft material samples after each centrifugal velocity increment comprises photographing the one or more soft material samples after each centrifugal speed increment.

13. The method of claim 1, wherein the method is carried out until the one or more solid particles have broken through the soft material in each of the one or more soft material samples.

* * * * *